April 14, 1959 W. P. OEHLER ET AL 2,881,849
DISK HARROW
Filed March 21, 1955 3 Sheets-Sheet 1

INVENTOR.
WILLIAM P. OEHLER
LESLIE W. JOHNSON
BY
ATTORNEYS

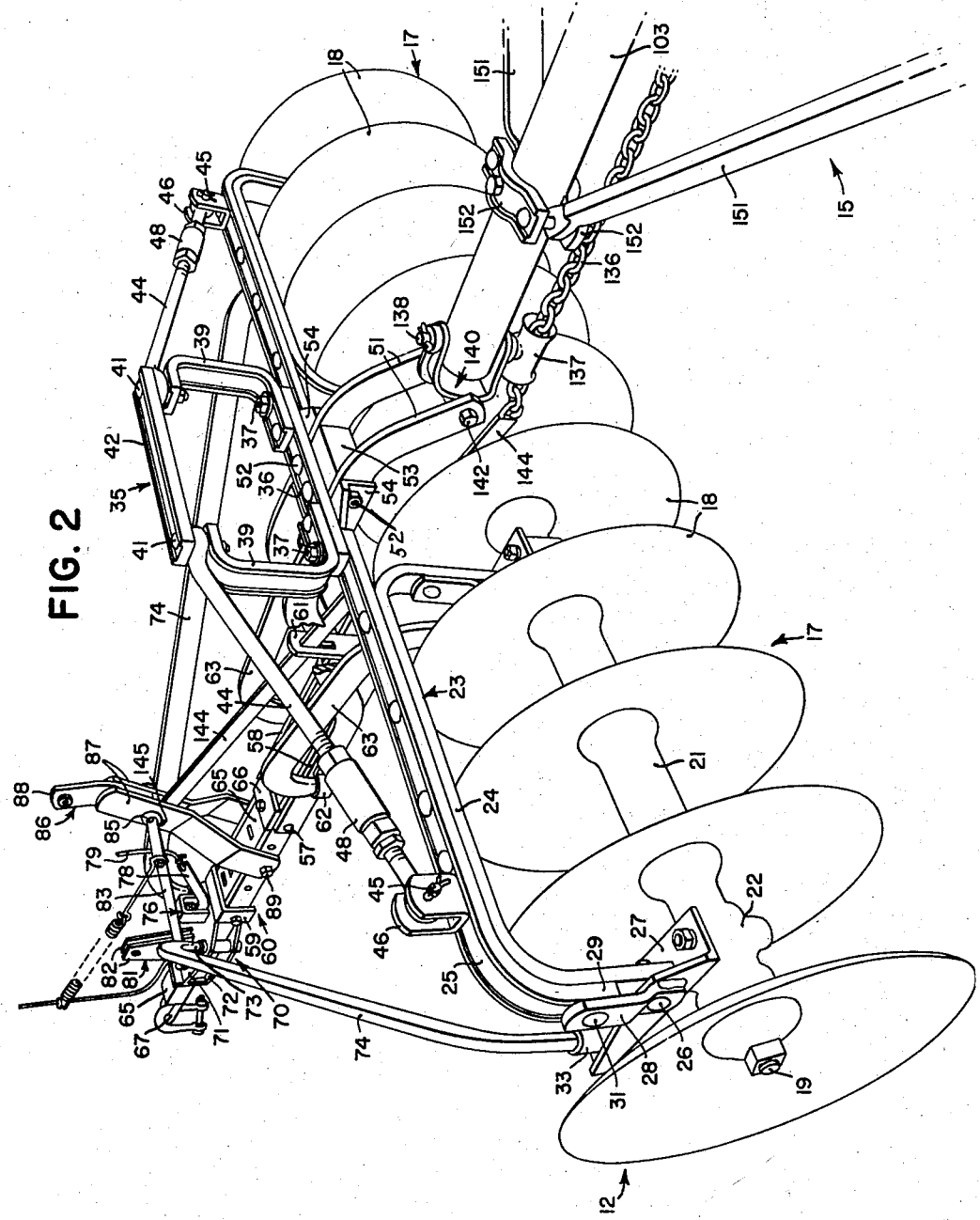

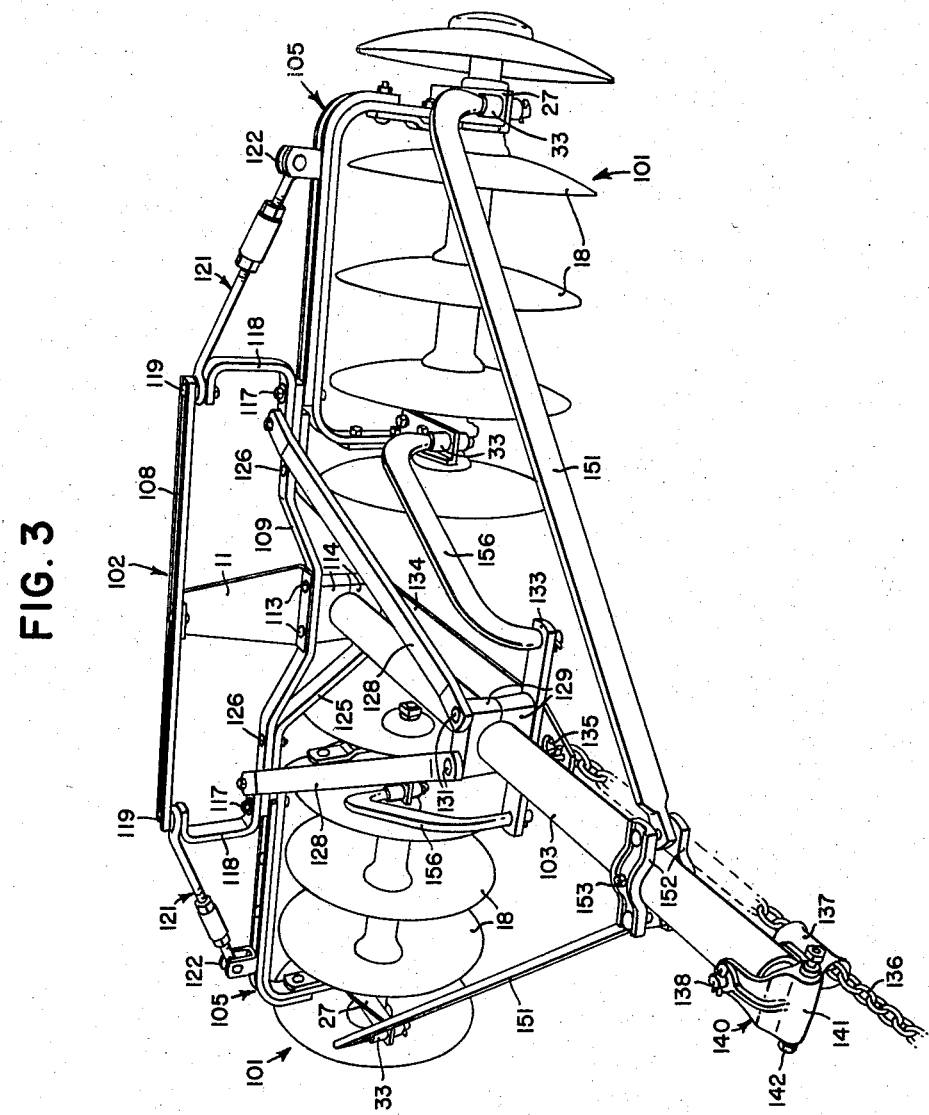

United States Patent Office 2,881,849
Patented Apr. 14, 1959

2,881,849
DISK HARROW

William P. Oehler and Leslie W. Johnson, Moline, Ill., assignors, by mesne assignments, to Deere & Company, a corporation of Delaware Application March 21, 1955, Serial No. 495,662

18 Claims. (Cl. 172—580)

The present invention relates generally to agricultural implements and more particularly to double-acting or tandem disk harrows.

The object and general nature of the present invention is the provision of a tandem or double-action disk harrow in which the front gangs may swing about a generally fore-and-after extending axis relative to the propelling means, usually a farm tractor, and the rear gangs may swing as a unit about a generally fore-and-aft extending axis relative to the front gangs, whereby the implement is particularly adapted for use over uneven ground, such as is frequently encountered in territories where rice is grown. More specifically, it is a feature of this invention to provide a disk harrow having sufficient flexibility as between the front and rear gangs to readily pass over terraces, borders and the like.

Another important features of this invention is the provision of a double-action or tandem disk harrow in which means is provided for straightening and angling the gangs, which means is constructed and arranged to act, in effect, to reduce the downward pressure exerted by the front gangs and increase the down pressure exerted by the rear gangs.

Another feature of this invention is the provision of a disk harrow having angling means acting against a rigid drawbar and the rear gang for reducing the downward pressure exerted by the front gangs and correspondingly increasing the downward pressure exerted by the rear gangs.

These and other objects and advantages of the present invention will be apparent to those skilled in the art after a consideration of the following detailed description of the preferred structural embodiment, taken in conjunction with the accompanying drawings illustrating such embodiment, in which:

Fig. 2 is a perspective view of the front gang assembly and associated drawbar structure with a portion of the rear gang assembly pivotally connected with the front frame structure of the front gang assembly.

Fig. 3 is a perspective view of the rear gang assembly.

Figure 1:
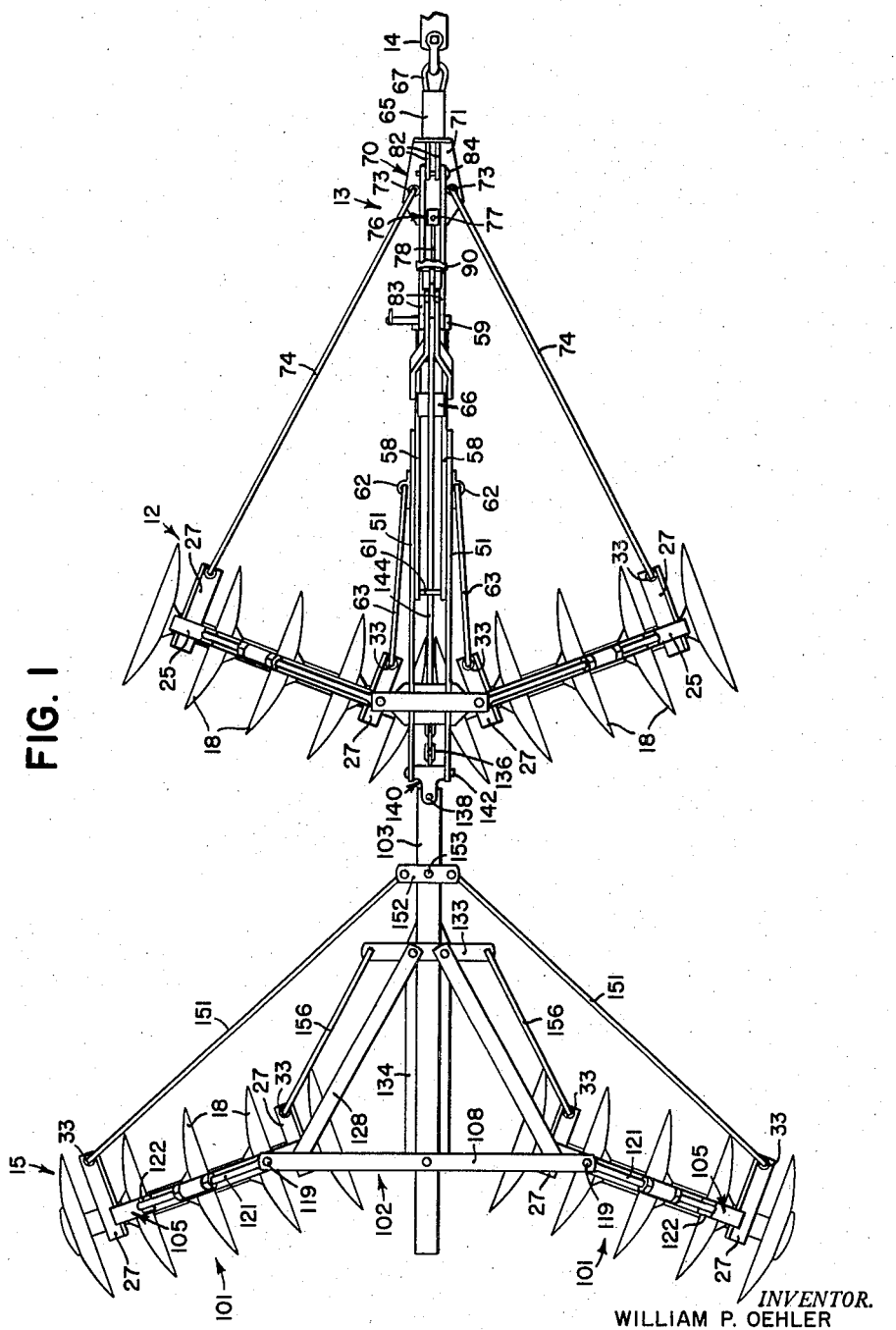
Fig. 1 is a plan view of a disk harrow in which the principles of the present invention have been incorporated, the harrow being shown in its angled or working position.

Referring first to Fig. 1, the disk harrow of the present invention comprises a front gang assembly 12 including drawbar means 13 adapted to be connected to a propelling means, such as a tractor, as represented by the rear portion of the tractor drawbar 14, and a rear gang assembly 15. The latter is pivotally and swingably connected with the front gang assembly 12 by means that will be referred to in detail later.

As best shown in Fig. 2, the front gang assembly includes a pair of disk gangs 17, each including a plurality of disks 18 mounted on a suitable gang shaft 19 and held in proper relation by spacing spools 21, one at each end of each gang including or carrying suitable bearing means 22 to which a generally inverted U-shaped gang frame 23 is connected. Each gang frame 23 is made up of two bars 24 and 25, the bar 24 comprising a U-shaped member having brackets pivotally connected, as at 26, to a horizontal, generally fore-and-aft extending angle member 27 that is bolted to the top of the associated bearing unit 22. The brackets just mentioned include the lower end portions of the U-shaped member 24 and the associated hammer straps 28 that are fixed thereto. The other frame bar 25 comprises an L-shaped part that extends along the top of the U-shaped frame bar 24 and extends laterally inwardly thereof, the downturned portion 29 of the upper bar 25 being apertured to receive the same bolt 31 that connects the outer hammer strap 28 to the associated downturned end of the bar 24. Each of the angle members 27 extends forwardly and is provided with a vertical sleeve section 33 into which the lower downturned ends of angle-control links are connected. The angle-control links will be described later.

A front frame structure 35 is disposed between the front gangs 17 and is pivotally connected to the inwardly extending ends of the gang frame bars 25. The front frame structure 35 includes a lower crossbar 36 that is apertured to receive pivot bolts 37 that connect the bar 36 to the inner ends of the gang frame bars 25. Secured to and forming a part of the frame structure 35 is a pair of U-shaped upright bars 39, the lower ends of which are fixed to the bar 36 and also apertured to receive the pivot bolts 37. The upper ends of the U-shaped bars 39 have laterally inturned portions that are apertured to receive pivot means 41, preferably in the form of bolts or the like, by which an upper crossbar 42 is connected to the U-shaped bars 39. The pivot means 41 also receive the inner ends of a pair of diagonally extending brace links 44, the outer ends of which are pivoted, as at 45, to a U-shaped bracket 46 that is connected to the laterally outer portion of each of the front gang frames 23. Each of the links 44 is adjustable, as by turnbuckle means 48.

Also forming a part of the front frame structure 35 is a pair of upwardly arched, laterally spaced apart bars 51 the generally central portions of which are fixed, as by transverse bolt means 52, to a central block 53 and an associated pair of angle brackets 54, the latter and the block 53 being secured, as by rivets or the like, to the lower crossbar 36. The latterally spaced apart bars 51 extend downwardly and forwardly from the attaching block 53 and are bolted, respectively, as at 57, to a pair of laterally spaced apart, fore-and-aft extending bars 58. A spacer yoke 59 connects the forward ends of the bars 58 together, and a similar spacing member 61 interconnects the rearmost ends of the bars 58. The forward portions of the bars 51, and the bars 58 to which they are rigidly attached, form a forward extension 60 of the front frame structure 35. Secured to the outer side of each of the bars 51 adjacent the forward ends is a socket member 62 that receives the downturned end of the associated laterally inner draft-control link 63. The rear end of each of the links 63 is connected into the vertical sleeve section 33 of the laterally inner bracket angle 27. The angle-control links 63 extend generally in a horizontal direction and, with the forward extension 60 of the front frame structure 35, lie in or adjacent the generally horizontal plane that passes through the axes of the front disk gangs 17.

A front drawbar member, preferably in the form of an inverted channel 65, is slidably disposed between the frame extension bars 58. Secured to the rear end of the drawbar channel 65 is a pair of stop members 66, the upper one of which cooperates with the spacer yoke 59 that limits the forward travel of the drawbar 65 relative to the forward frame extension 60 of the front frame structure 35. The front end of the drawbar member 65 is connected by clevis means 67 with and is supportingly carried on the drawbar 14 of the propelling tractor. A slide 70 is carried on the front portion of the drawbar 65 and includes upper and lower sections 71 and 72 between which the drawbar channel 65 is disposed. Each of the sections 71 and 72 is extended laterally to provide apertured sections receiving vertical sleeves 73 in which the forward downturned ends of a pair of outer angle-control links 74 are disposed. The rear ends of the links 74, which extend divergingly from the forward portions of the drawbar 65, have downturned end sections that are pivotally connected into the sleeves 33 of the laterally outer bearing angles 27 on the front gangs. The upper plate section 71 of the slide 70 carries a latch box unit 76, and the plunger 77 of the unit 76 normally is disposed in an opening adjacent the forward end of the channel 65 so as to lock the slide 70 to the forward end of the drawbar channel 65. The plunger 77 is operated by an arm 78 that is controlled by a rope or cable 79 that extends forwardly to the operator's station on the tractor. This provides, when desired, a rope-control arrangement for the disk harrow, as will be described later, but since most farm tractors today are equipped with hydraulic power lift mechanism including a remote cylinder unit, we have provided in our harrow means to detachably receive the remote cylinder of a farm tractor of the type that is generally available today. Mounted on the slide 70 is a bracket 81 comprising two spaced-apart bracket plates 82 apertured to receive one of the pivot pins of the associated hydraulic power actuated cylinder. A pair of reaction links 83 are pivotally connected to the bracket plates 82, as at 84, and the rear ends of the links 83 are pivotally connected, as at 85, to an angle-control lever 86 that is made up of two strap members 87 interconnected together at their upper ends by a cylinder-receiving bracket 88 and spaced apart at their lower ends so as to straddle the forward portions of the bars 58 of the forward frame extension 60, the lower end of the bars 87 being pivoted to the bars 58 by pivot studs 89 or the like.

As will be seen from Fig. 1, and assuming that the drawbar 65 is hitched to a farm tractor extension of the power cylinder, indicated by the reference numeral 90, will exert a force against the upper bracket 88 of the lever 86 and swing the lower ends forwardly relative to the slide 70 and the front end of the drawbar 65 to which the slide is connected. The forward movement of the lower end of the angle-control lever 86 acts through the bars 58 to shift the entire front frame structure 35 forwardly relative to the rear ends of the outer angle-control links 74, thus bringing the front gangs 17 into a straightened or transport position, which is the position shown in Fig. 2, from the angled or working position that is shown in Fig. 1. Angling mechanisms of this general character is shown in U. S. Patent 2,579,086, issued December 18, 1951 to William P. Oehler, to which reference may be made if desired.

The rear gang assembly is indicated in its entirety by the reference numeral 15 and includes right- and left-hand disk gangs 101 swingably connected with a rear frame structure 102 that is rockably and slidably mounted on a beam member 103, preferably in the form of a pipe, that is connected for both lateral and vertical swinging movement relative to the front gang assembly described above. The rear gangs 101 are of substantially identical construction with respect to the front gangs, and hence the same reference numerals have been applied to the various parts of the gangs as well as the various parts of the gang frames which, for the rear gangs, are indicated by the reference numeral 105. The rear frame structure 102 is similar to the forward frame structure 35 and comprises a pair of upper and lower transverse bars 108 and 109 that are interconnected centrally by a vertical plate 11 that is secured at its upper end to the central portion of the bar 108 and is connected at its lower portion, as by a pair of bolts 113, not only to the central downwardly extended portion of the lower bar 109 but also to a rear pair of pivot blocks 114 that are disposed about the rear end of the beam member 103. The laterally inner end portions of the rear gang frames 105 are pivotally connected, as at 117, with the laterally outer end portions of the lower transverse bar 109, and a pair of U-shaped bars 118 extend upwardly from the outer ends of the lower bar 109 to points of connection, as at 119, with the laterally outer end of the upper frame bar 108. The connections 119 preferably are pivot bolts and the parts are so arranged that the laterally inner ends of diagonal bracing links 121 are received by the pivots 119 between the parts 108 and 118. The outer ends of the bracing links 121 are connected pivotally to brackets 122 that are carried by the laterally outer portions of the gang frame parts 105. The rear frame structure 102 also includes a lower reenforcing, generally V-shaped bar 125 that is extended underneath the pivot blocks 114 and then laterally upwardly and outwardly to the outer portions of the bar 109, being secured to the latter by rivets 126 or other suitable means. A pair of brace links 128 extend convergingly forwardly from the laterally outer portions of the lower transverse bar 109 and are fixed at their forward ends to a forward pair of pivot blocks 129 by clamping bolts 131 or the like. The forward pivot blocks 129 encircle the beam member 103, and at the lower side of the lower pivot block 129, a transverse bar 133 and the forward end of a fore-and-aft extending plate member 134 are connected, preferably by the clamping bolts 131.

The forwardmost end of the plate member 134 is apertured, as at 135, to receive an angle controlling element 136, preferably in the form of a chain, the forward portion of which extends through a guide sleeve 137 that is carried on the lower end of a pin 138 that extends through apertures in the forward end of the pipe member 103 and through apertures in the associated yoke section of a clevis casting 140. The latter includes a horizontal forward sleeve section 141 through which a transverse pin 142 is disposed, the latter member establishing a transverse pivot axis about which the beam member 103 may swing relative to the front frame structure 35. The rear gang assembly may swing laterally relative to the front gang assembly about the pin 138 as an axis. At its forward end, the chain 136 is connected to a fore-and-aft extending bar 144 that at its forward end is connected by a pivot bolt 145 carried by the angling lever 86 a short distance below the pin 85 that connects the rear ends of the reaction links 83 with the lever 86.

A pair of forwardly converging angle-control links 151 have downturned ends entering the sleeve sections of the bearing bracket angles at the outer ends of the rear disk gangs, and the forward ends of the angle-control links 151 are pivotally connected to a pair of bracket parts 152 that are fixedly secured, as by a bolt or rivet 153, to the forward portion of the rear beam member 103. The inner ends of the rear disk gangs are similarly connected, through relatively short link means 156, with the transverse bar 133 that is fixed to the lower portion of the forward pair of pivot locks 129.

The operation of the disk harrow of the present invention is substantially as follows.

Assuming that the disk gangs are in their straightened or transport position, as shown in Figs. 2 and 3, the cylinder 90 is retracted, which causes the lower end of the angle-control lever 86 to shift rearwardly relative to the front drawbar member 65. This movement of the lever 86 acts through the bars 58 to shift the front frame structure 35 rearwardly, which swings the inner ends of the front gangs rearwardly and also the entire rear gang assembly, except that the rear frame structure, being connected to the generally central portion of the angling lever 86 through the chain 136 and bar 144, is prevented from moving rearwardly as far as the pipe member 103 and the outer ends of the rear gangs are moved. Thus, in effect, the rear gangs are angled by shifting the rear frame structure forwardly along the pipe member 103. The disk gangs are swung into their straightened or transport position by a reverse movement of the parts. When operating over uneven terrain, the rear gang assembly may pivot about the pipe member 103 by virtue of the pivotal connection of the front and rear pivot blocks 114 and 129 on the rear portion of the pipe member or beam member 103.

Since the pull due to the pressure of the soil against the rear disk is transmitted through the chain 136 and then upwardly through the link 144 to the lever 86, there is an upward component of force exerted on the guide sleeve 137. This has the effect of lifting up on the front frame and the reaction thereof is exerted as a generally downwardly directed force against the rear gangs.

Having described our invention, what we claim is:

1. In a tandem disk harrow, a front gang assembly, a rear gang assembly pivotally connected with the front gang assembly for movement relative to the latter about a transverse axis, angling means extending between said gang assemblies and including a tension element connected at its ends with said gang assemblies, respectively, and passing below said transverse axis, said axis lying below a straight line joining the points of connection of the ends of said element with said gang assemblies, whereby the pull transmitted by said element tends to raise the point of pivotal connection between said gang assemblies and thus apply a downwardly directed force against the rear gang assembly.

2. In a tandem disk harrow, a front frame structure, front disk gang means connected therewith, a rear frame structure, pivot means connecting the latter frame structure with said front frame structure for movement relative thereto about a generally transverse axis, rear disk gang means shiftably connected with said rear frame structure, and operating means including a movable part acting against said front frame structure and a connection extending from said part to said shiftable rear disk gang means to move the latter, said connection passing from said movable part generally downwardly and rearwardly to a point underneath said transverse pivot and then generally rearwardly to said rear frame structure whereby force transmitted through said connection tends to raise said front frame structure and to apply a downwardly exerted component of force to said rear frame structure.

3. In a disk harrow, a gang assembly comprising a pair of disk gangs, a frame structure to which the gangs are swingably connected at their inner ends for movement relative thereto about generally vertical axes, said frame structure comprising a rear section to which the inner ends of said gangs are connected and a forward section having laterally outwardly disposed portions, draft links extending from said portions to the lower portions of the inner ends of said gangs, a central generally fore-and-aft extending beam member on the rear portion of which the forward and rear sections of said frame structure are mounted for rotation about the longitudinal axis of and also for sliding fore-and-aft movement on said beam member, and angle controlling links extending from the forward portion of said beam divergingly rearwardly to the outer end portions of said gangs.

4. In a tandem disk harrow, a front frame structure, front disk gang means connected therewith, a rear frame structure, pivot means connecting the latter frame structure with said front frame structure for movement relative thereto about a generally transverse axis, rear disk gang means shiftably connected with said rear frame structure, a guide carried below said transverse axis, and operating means including a movable part acting against said front frame structure and an operating connection extending from said part to said shiftable rear disk gang means to move the latter, said connection including a flexible element extending through said guide rearwardly to said rear gang means, said guide being located below a straight line connecting the points where said operating connection is connected with said part and with said rear disk gang means, whereby force transmitted through said connection tends to apply an upwardly directed force tending to lift said pivot means and the adjacent portions of said front and rear frame structures.

5. In a tandem harrow, a rear gang assembly comprising a pair of disk gangs, a frame structure, a central generally fore-and-aft extending beam member, said frame structure including a pair of fore-and-aft spaced parts rockably and slidably mounted on said beam, whereby said frame structure is both swingably and slidably mounted on said beam, means pivotally connecting the upper portions of the inner ends of said disk gangs to said frame structure for movement relative thereto about generally vertical axes, inner draft links connecting the lower portions of the inner ends of said disk gangs with the forward one of said fore-and-aft spaced parts, and outwardly and rearwardly extending link means connecting the forward end portion of said beam member with the outer ends of said disk gangs.

6. In a disk harrow, a generally fore-and-aft extending beam member, a frame structure comprising a pair of fore-and-aft spaced apart members rockably mounted on said beam member adjacent one end thereof, a rear transverse bar fixed to the upper portion of the rear one of said fore-and-aft spaced apart members, means rigidly interconnecting said latter members, a pair of disk gangs, each having a frame, means pivotally connecting the inner ends of said frames to the outer ends, respectively, of said transverse bar, and means including link means connecting the inner end portion of each of said disk gangs with the forward one of said fore-and-aft spaced apart members.

7. The invention set forth in claim 6, further characterized by a front transverse bar fixed to the lower portion of said forward member and receiving the forward ends of said link means, and a pair of brace links extending from the end portions of said rear transverse bar to said forward member.

8. In a disk harrow, a rear gang assembly comprising a generally fore-and-aft extending beam member, a transverse frame structure rockably mounted on the rear portion of said beam member and including a pair of transverse bars and means rigidly interconnecting said bars and holding them in vertically spaced apart relation, a pair of disk gangs, pivot means connecting the inner ends of said gangs to the outer ends of the upper and lower transverse bars of said frame structure for movement relative thereto about generally vertical axes, said pivot means acting to prevent vertical swinging of either gang relative to said transverse frame structure, whereby said gangs are swingable with said transverse frame structure about said beam member, a pair of angle control links pivotally connected at their rear ends to the outer portion of said disk gangs, bracket means fixed to the forward portion of said beam member, and means loosely connecting the forward ends of said angle control links with said bracket means.

9. In a disk harrow, a front gang assembly comprising a front frame structure, a pair of front gangs, each having a gang frame and each gang frame including a laterally inwardly extending bar, means pivotally connecting the laterally inner end of said bar to the adjacent portion of said frame structure, the latter including an upper transverse structure to which the inner ends of said gang frame bars are connected, a generally fore-and-aft extending part that includes curved bar means having front and rear ends disposed adjacent the plane of the axes of said gangs, and a forward extension connected to the forward end of said bar means, a drawbar member, said forward extension slidably receiving the rear portion of said drawbar member, link means connecting the inner portions of said gangs at points adjacent said plane with said forward extension, and a second link means connecting the outer portions of said gangs with the forward portion of said drawbar member.

10. The invention set forth in claim 9, further characterized by a rear gang assembly connected with the rear end of said curved bar means.

11. A disk harrow comprising a pair of front gangs, a pair of rear gangs, a front frame structure to which the inner ends of the front gangs are pivotally connected at their inner ends for generally fore-and-aft swinging movement, a drawbar member slidably connected with said frame structure, link means extending from the forward portion of said drawbar member to the outer ends of said front gangs, a rear frame structure to which the inner ends of the rear gangs are pivotally connected at their inner ends for generally fore-and-aft movement, a generally longitudinally extending beam member rockably receiving said rear frame structure and pivotally connected at its forward end to the rear portion of said front frame structure, link means connecting the outer ends of the rear gangs to the forward portion of said beam member, means connected with said drawbar member so as to react thereagainst and shift said front frame structure and said beam relative to said drawbar, and a connection extending from said rear frame structure forwardly to said frame-shifting means.

12. A disk harrow as set forth in claim 11, further characterized by said shifting means including a generally vertical lever connected at its lower end with said front frame structure and an anchoring link pivotally connecting said lever at a point above said lower end with said drawbar, said connection being connected with said drawbar through said lever and said anchoring link.

13. A disk harrow comprising a pair of front gangs, a pair of rear gangs, a front frame structure to which the inner ends of the front gangs are pivotally connected at their inner ends for generally fore-and-aft swinging movement, a drawbar member slidably connected with said frame structure, swivel means to connect the front end of said drawbar with a tractor and adapted to accommodate movement of said drawbar and frame structure about a fore-and-aft extending axis relative to the tractor, said front frame structure including means holding the front gangs in the same generally horizontal plane, link means extending from the forward portion of said drawbar member to the outer ends of said front gangs, a rear frame structure to which the inner ends of the rear gangs are pivotally connected at their inner ends for generally fore-and-aft movement, said rear frame structure including means holding the rear gangs in the same generally horizontal plane, a generally longitudinally extending pipe member rockably receiving said rear frame structure and pivotally connected at its forward end to the rear portion of said front frame structure for movement relative thereto about a generally transverse axis, link means connecting the outer ends of the rear gangs to the forward portion of said pipe member, means connected with said drawbar so as to react thereagainst and shift said front frame structure and said pipe member relative to said drawbar, and a connection extending from the forward end of said rear frame structure forwardly to said frame-shifting means.

14. In a disk harrow, a generally fore-and-aft extending beam member, a frame structure including front and rear pivot block means rockably mounted on said beam member, a plurality of transverse bars fixed rigidly to the rear pivot block means in generally vertically spaced-apart relation, a pair of disk gangs, each including a gang frame comprising a generally vertically disposed U-shaped member having its end connected to rotatably receive a gang of disks, pivot means connecting each gang frame with the ends of said bars so as to be held thereby in the same generally horizontal frame, brace links connecting certain of said transverse bars with the upper portion of the front pivot block means, draft links connecting the lower portion of said front pivot block means with the inner ends of said gang frames, bracket means connected to the forward portion of said beam member, and angling link means having a loose connection with said bracket means and connected with the outer ends of said gang frames.

15. In a disk harrow, a generally fore-and-aft extending beam member, a frame structure including front and rear members rockably mounted on said beam member, a fore-and-aft extending rigid part interconnecting said members, a transverse structure fixed rigidly to said rear member, a pair of disk gangs, each including a gang frame comprising a generally vertically disposed U-shaped member having its end connected to rotatably receive a gang of disks, pivot means connecting each gang frame with the adjacent end of said transverse structure so as to be held thereby in the same generally horizontal plane and to swing therewith relative to said fore-and-aft extending beam member, brace links connecting the end portions of said transverse structure with said front member, draft links connecting said front member with the inner ends of said gang frames, bracket means connected to the forward portion of said beam member, and angling link means having a loose connection with said bracket means and connected with the outer ends of said gang frames.

16. In a disk harrow, front and rear pairs of transverse disk gangs, each of the latter including a gang frame overlying the disks, generally fore-and-aft extending front frame means having at its forward end draft-receiving means and at its rear end bar means provided with front and rear portions disposed adjacent the horizontal plane of the axes of said front gangs and with intermediate portions disposed above said disks and generally in the same horizontal plane of the upper portions of the front gang frames, pivot means connecting the upper portions of said front gang frames with said intermediate bar portions, rear frame means to which said rear gangs are connected, and draft-transmitting means extending rearwardly from the rear lower portions of said bar means to said rear frame means.

17. In a disk harrow, a generally fore-and-aft extending beam member, a transverse frame member rockably connected at an intermediate portion with and slidable in a fore-and-aft direction on the rear portion of said beam member for movement relative thereto about the generally fore-and-aft extending axis of said beam member, a pair of rear disk gangs, means swingably connecting the inner ends of said gangs with said transverse frame member so as to hold said gangs in substantially the generally horizontal plane of said member, angle control links connected at their rear ends with the outer portions of said gangs and loosely connected at their forward ends with said beam member forward of said rockable transverse frame member, and means connected with the transverse frame member to shift the latter along the beam member to change the angle of said gangs.

18. A disk harrow comprising a rigid generally fore-and-aft extending main frame member, a transverse frame member swingably connected at an intermediate portion to the rear portion of the main frame member for movement relative thereto about a generally fore-and-aft extending axis coinciding with the longitudinal axis of said main frame member, said transverse frame member including a rear transverse structure rockable relative to the rear end portion of said main frame member, pivot blocks encircling and rockable on said main frame member forward of said rear transverse structure, a transverse bar connected to said blocks and extending laterally outwardly thereof, and means interconnecting said blocks with said rear transverse structure, a pair of rear disk gangs connected with said transverse frame member and adjustable relative thereto about said generally vertical axes, a pair of draft links connecting the ends of said transverse bar with the inner end portions of said disk gangs, and a pair of angle-control links connecting the outer ends of said disk gangs with the main frame member forward of said blocks.

References Cited in the file of this patent
UNITED STATES PATENTS

| Number | Name | Date |
|---|---|---|
| 1,388,159 | Bissell | Aug. 23, 1921 |
| 1,667,392 | Robinson | Apr. 24, 1928 |
| 2,423,731 | Schiefelbein | July 8, 1947 |
| 2,538,594 | Rutter | Jan. 16, 1951 |
| 2,579,086 | Oehler | Dec. 18, 1951 |
| 2,584,238 | Sonneman | Feb. 5, 1952 |
| 2,686,395 | Taylor | Aug. 17, 1954 |
| 2,688,831 | Rude et al. | Sept. 14, 1954 |
| 2,755,613 | Oehler et al. | July 24, 1956 |